ELECTRO-OPTICAL ASSOCIATIVE MEMORY

RALPH W. HAAS,
WILFRIED H. HELL,
INVENTOR.

BY R. E. Geanque

ATTORNEY

ELECTRO-OPTICAL ASSOCIATIVE MEMORY
FIG. 5
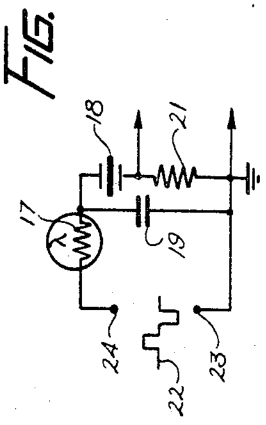
FIG. 4
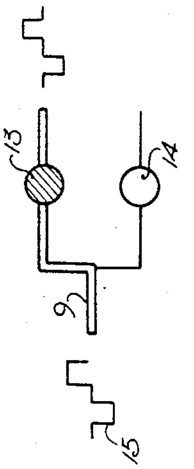
FIG. 3
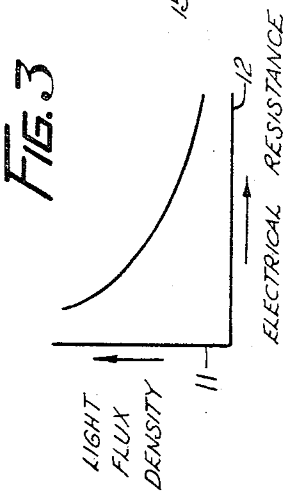
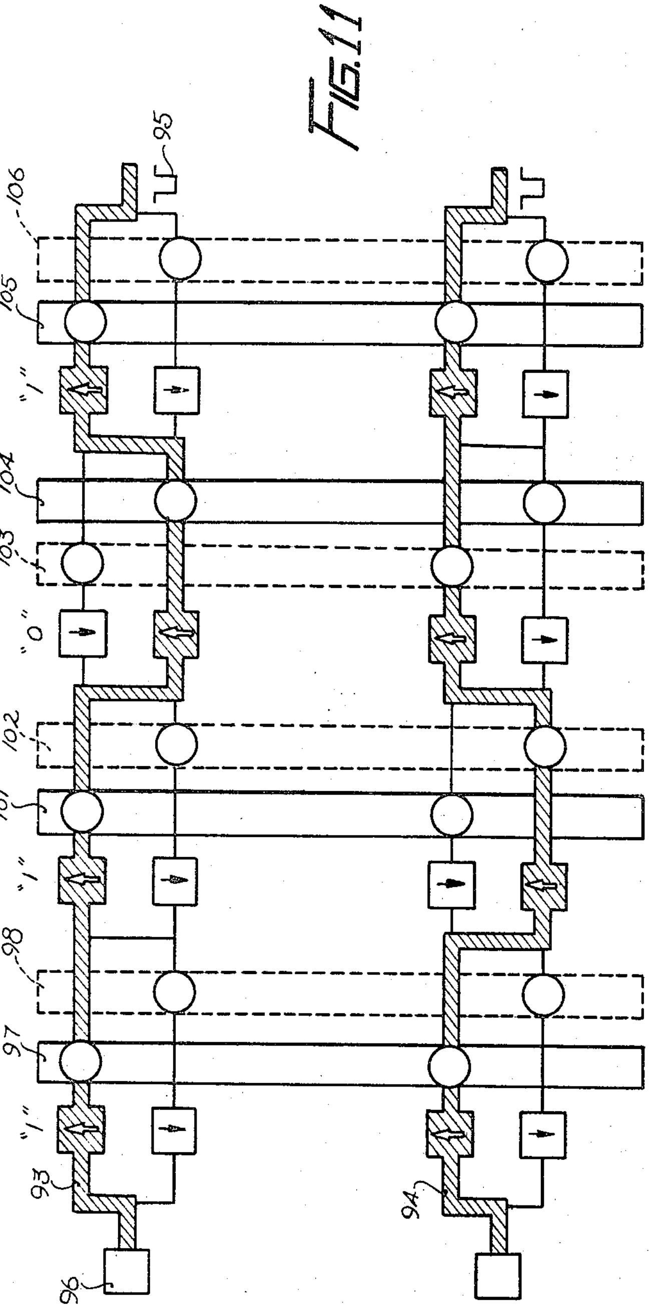
RALPH W. HAAS,
WILFRIED H. HELL,
INVENTOR.
BY R. E. Geauque
ATTORNEY

RALPH W. HAAS,
WILFRIED H HELL,
INVENTOR.

BY R. E. Geangue
ATTORNEY

RALPH W. HAAS,
WILFRIED H. HELL,
INVENTOR.

BY

ATTORNEY

ELECTRO-OPTICAL ASSOCIATIVE MEMORY

RALPH W. HAAS,
WILFRIED H. HELL,
INVENTOR.

BY R. E. Geauque
ATTORNEY

ELECTRO-OPTICAL ASSOCIATIVE MEMORY

RALPH W. HAAS,
WILFRIED W. HELL,
INVENTOR.

BY R. E. Geauque
ATTORNEY

RALPH W. HAAS,
WILFRIED H. HELL,
INVENTOR.

BY R. E. Geauque

ATTORNEY

RALPH W. HAAS,
WILFRIED H. HELL,
INVENTOR.

BY R. E. Geauque
ATTORNEY

United States Patent Office 3,407,393
Patented Oct. 22, 1968

3,407,393

ELECTRO-OPTICAL ASSOCIATIVE MEMORY

Ralph W. Haas, Chatsworth, and Wilfried H. Hell, Woodland Hills, Calif., assignors to The Marquardt Corporation, Van Nuys, Calif., a corporation of California Filed June 2, 1964, Ser. No. 372,027
28 Claims. (Cl. 340—173)

ABSTRACT OF THE DISCLOSURE

An associated memory for data processing is described which employs ferroelectric elements having two stable polarized states for digital storage and photoconductive elements for logical gating or path determination. The storage elements in which words are stored are connected in a series fashion and memory interrogation is accomplished by a combination of light and voltage signals. This film construction permits extremely high bit densities. Optional operating modes are described, including "write upon match," and masking to permit a variety of inquiry functions to be accomplished.

This invention relates to a memory for electronic data processing equipment and more particularly to a solid-state electro-optical associative memory constructed of thin films.

The problem of providing very large scale information storage with rapid access time has received the attention of many computer designers. An approach to the problem of providing improved access to large stores of data which has had recent attention is the associative or content-addressed memory. However, at the present state of the art no economically practical method of implementing a large scale associative memory has been devised. One example of an associative memory is disclosed by Walter K. French in Patent No. 3,123,706. However, the use of large numbers of diodes and/or punched cards impose undesirable economic limitations on the associative memory therein disclosed. In contrast, the apparatus of the present invention employs novel and improved thin film construction techniques by means of which extremely high bit densities may be obtained. Prior memory systems have data capacity limits of the order of several hundred thousands of bits and are directed toward limited applications. Furthermore, prior devices have exhibited limitations in power demand, signal to noise ratio, isolation, and economy. The novel and improved memory of the present invention is based on the utilization of electro-optical solid-state materials to provide the various logic functions of an associative memory, and the utilization of thin-film solid-state materials for the storage media.

An associated memory is a form of storage in which the addressing of words is performed by content as opposed to a random access memory which stores information in a given location and is addressed by location. Information in an associative memory may be stored in an arbitrary or random order, whereas the information in a conventional memory is normally stored in an ordered form. The associative memory realizes its advantage by the fact that every word, and every bit, in the memory can be addressed simultaneously, in parallel, and at high speed. When retrieval of a word is desired, the memory is addressed at its input with a tag which is identical to some unique portion of the word. The word may have one or more unique portions any one of which may be used as the tag. A comparison is indicated between the tag of the desired word and the tag at the input to the memory and readout of all of the data digits associated with the word is thereby achieved.

It is important to distinguish between a conventional tag memory and an associative memory. A tag memory, as has been used prior to the development of the associative memory concept, has the tag portion of the word restricted to a certain part of the word. The tag in this type of memory is not a portion of the word but is an attachment to the word. An associative memory may use any portion of the word as a tag and furthermore, the word may be found at one time in a given memory using one portion of the word as a tag and the same word may be located at a later time using a different portion of the word as a tag.

An associative memory has a number of advantages. The word capacity may be very high per unit volume. Also, in accordance with the present invention the memory system is relatively easy to construct and maintain, and is relatively inexpensive. In addition, due to the inherent self logic feature of the memory element of an associative memory, a flexibility of addressing large masses of data is realized which is not possible with other types of storage. The associated memory of the present invention is based upon the use of ferroelectric elements for digital storage and photoconductor elements for logical gating, or path determination betwen these elements.

By applying the combination of light and voltage, a unique circuit isolation is achieved which permits the storage elements forming words to be connected in a series fashion, thus eliminating the usual difficulties caused by parallel loading of a matrix type of organization or structure in conventional memories. This novel method and structure provides simultaneous interrogation of all stored bits contained in the memory. Specific data at any location in the memory may be changed by utilizing a "write-upon-match" method. Resolving of multiple matches is obtained by a novel logical gating method. A feature of the invention is an unusually low cost per memory bit made possible by thin-film layer fabrication. The bit detection technique employed, being inherently passive, greatly reduces power requirements of the system. Another feature of the invention is the unusually high bit packing density which, in a practical construction, may be of the order of hundred of millions or even billions of bits per unit area or per unit volume. The invention also provides means for providing full masking capabilities, as will appear hereinafter.

Having in mind the defects and limitations of prior art memory devices, it is an object of this invention to provide a large-scale associative digital memory which overcomes the limitations of all such prior devices.

Another object of the present invention is to provide a novel and improved electro-optical solid-state, thin film associative memory for the storage of digital data.

It is another object of the invention to provide a novel and improved digital data memory having very low power demand.

It is yet another object of the invention to provide a novel and improved digital memory having improved bit packing density.

Still another object of the invention is to provide a novel and improved digital data memory having an improved signal to noise ratio.

Still another object of the invention is to provide a novel and improved digital data memory having a very low cost per bit storage element.

Yet another object of the invention is to provide a novel and improved digital data memory having a high degree of inherent logic, and which has a potential capability for self organization.

Yet another object of the invention is to provide a novel and improved digital data memory having only minimal external circuitry requirements.

It is still another object of the invention to provide a novel and improved digital data memory which permits design and operational flexibility by reason of its ability to allow trade-offs in parameters such as cycle time, word structure, readout mode, and modular construction.

These and other objects of the invention will be understood more completely from the following detailed description, taken in conjunction with the drawings in which:

FIGURE 3 is a graphic plot illustrating the variation of electrical resistance as a function of light flux on the photoconductor material employed in the invention.

FIGURE 4 illustrates the arbitrary conventions employed to illustrate the functioning of the bit store and which are useful in the exposition of the invention.

FIGURE 5 is a simplified equivalent circuit diagram of the bit store.

FIGURE 11 is a diagrammatic illustration showing two four-bit word polarization states before the switching mode.

Like numerals refer to like parts throughout the several views.

Figure 8:
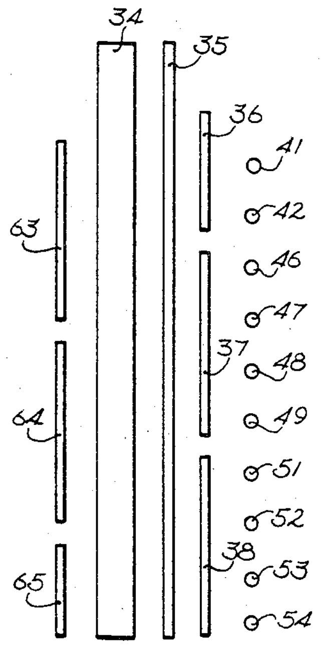
FIGURE 8 is an exploded end view of the apparatus of FIGURE 7.

As will become apparent from the ensuing description, the invention resides partly in the physical and electrical structures and interrelationships embodied in the ferroelectric, photoconductive, and electroluminescent components of the system as herein specifically illustrated, but also embraces the concept of the system itself, considered as an integral whole, and independently of the structural details of its several parts.

To clarify some of the terms used in the specification and claims the following definitions are set forth:

Photoelectric element: A device in which a significant and useful change in electrical characteristics is caused by incident radiation energy.

Inquiry: The operation of interrogating every word and bit in the memory simultaneously and providing an indication of where a match occurs between the stored data and the inquiry.

Read-in: The ability to erase previously stored information and insert new data. This function can also involve an accounting of unused bit storage locations. Alternatively, one bit of very word can be assigned to indicate that data has been inserted into a specific location.

Write-upon-match: The ability to simultaneously change all words that coincide with the inquiry.

Multiple match resolution: The ability to logically seek only those detector elements which indicate a match for readout purposes.

Readout: The ability to selectively readout any individual words after an inquiry has been made.

Masking: An operation which allows variable control of the depth of the inquiry by interrogating only certain bits (tag) of a word.

As indicated hereinabove, the present invention is based upon the use of ferroelectric elements for digital storage and photoconductive elements for logical gating, or path determination, between these elements. This combination permits a memory interrogation by light and voltage. The ferroelectric element, comprising essentially a dielectric material sandwiched between two conducting electrodes, is able to be reversibly polarized in either of two states and thus may be used to store binary information. The ferroelectric element exhibits a substantially rectangular hysteresis loop which describes the change in polarization with application of voltage. Application of voltages of opposite polarity cause the element to switch between its two states of positive and negative polarization. When reversing polarization, the element will absorb or release charges similar to a capacitor. However, if an element is in a given state of polarization, and the applied voltage is of the same polarity, the element will not be switched but will be driven further into saturation.

The photoconductive elements, when illuminated, will exhibit a low resistance, and in a dark condition, will exhibit a very high resistance. Thus, the illuminated photoconductors may be used to establish a particular path of current through the ferroelectric elements. Using combinations of these ferroelectric and photoconductive elements, a basic form of logical approach is provided which permits implementing the various functions of an associative memory.

*Bit structure*

Figure 1:
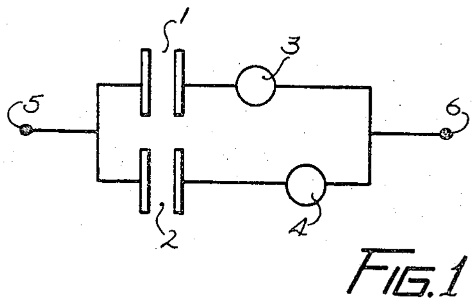
FIGURE 1 is a schematic diagram of the fundamental bit store structure of the invention.
Figure 2:
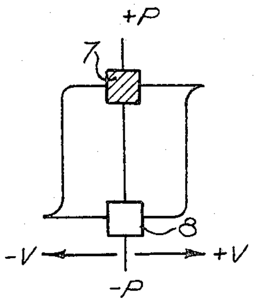
FIGURE 2 illustrates a typical hysteresis loop of the ferroelectric element employed in the invention.

The fundamental bit structure of a digital word in the memory consists of two ferroelectric elements 1 and 2 and two photoconductors 3 and 4 as shown in FIGURE 1. Each pair of elements (e.g. 1 and 3) are connected in a series arrangement between terminals 5 and 6. To facilitate explanation of the invention, an arbitrary convention has been adopted throughout this specification in which a state of positive polarization in the upper ferroelectric element 1 represents a stored binary "one." Conversely, a state of positive polarization in the lower ferroelectric element 2 represents a stored "zero." Also, application of light to the upper photoconductor element 3 represents interrogation for a binary "one." Conversely, application of light to the lower photoconductor element 4 represents interrogation for a binary "zero." The binary storage properties of the ferroelectric elements are based upon the hysteresis loop represented in FIGURE 2. This loop describes the change of polarization with applied voltage. The shaded box 7 represents a state of polarization for a binary "one," while the unshaded box 8 indicates the state of polarization for a binary "zero." If the applied voltage is positive, the element will be polarized to represent a binary "one" if it has previously been in the "zero" state.

The read-write gating properties of the photoconductor elements are based upon the characteristic indicated in FIGURE 3 in which light flux density is plotted along the axis of the ordinate 11 and electrical resistance is plotted along the axis of the abscissa 12. A suitable photo conductive material is cadmium selenide. As can be seen in FIGURE 3, the application of light causes a decrease in resistance and thus allows an increase in the passage of current. Since the current path through the ferroelectric elements is selected by illuminating the photoconductors (path of low resistance), the pictoral representation of interrogation, shown in FIGURE 4, in which the path 9 is through the shaded element 13 (rather than the unshaded element 14) will be used hereinafter. The interrogation output waveform is represented at 15.

FIGURE 5 is a simplified schematic circuit diagram of the basic bit store and represents the internal resistance 17 of the photoconductor, the ferroelectric element 18, and its stray capacitance 19, and the load resistance 21. The input voltage is applied as a suitably polarized pulse 22 between ground 23 and input terminal 24; the output appears across load resistance 21.

Figure 6:
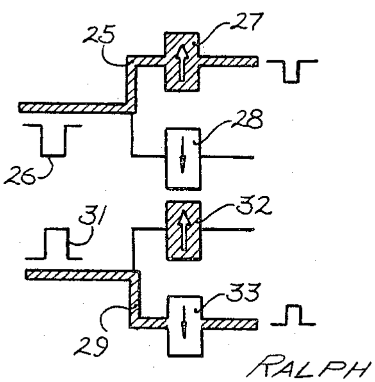
FIGURE 6 is a diagrammatic illustration further illustrating the conventions used in subsequent figures and which shows the result of the application of negative and positive pulses to the bit store elements.

FIGURE 6 further represents the convention used hereinafter for representing the various states of the bit structure for storing a binary "one" and for storing a binary "zero." Path 25 results from the application of a negative pulse 26 to ferroelectric elements 27 and 28 having opposite polarizations. Path 29 results from the application of a positive pulse 31 to ferroelectric elements 32 and 33 having the same polarization as elements 27 and 28, respectively. The application of first a negative pulse and then a positive pulse (signal 15), to an illuminated photoconductor element is shown in FIGURE 4, mentioned earlier.

Having described the basic bit structure, and the conventions used herein to represent binary bits in the logic diagrams, a multiple bit memory device will now be described, after which the word structure employed in this device will be discussed.

*Physical construction of memory device*

Figure 7:
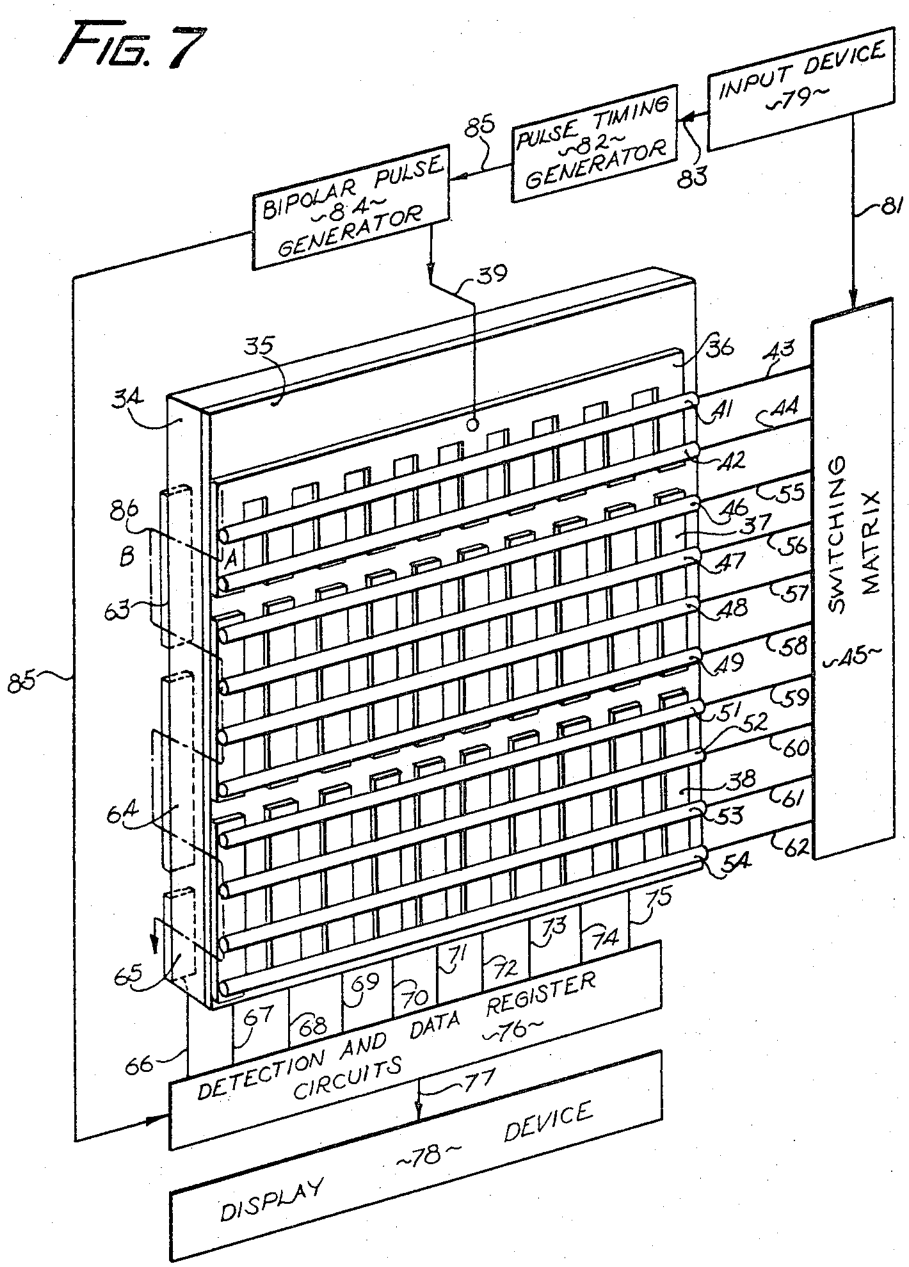
FIGURE 7 is a somewhat diagrammatic perspective view of a preferred embodiment of a memory according to the invention, including a block diagram of certain ancillary circuits used therewith.

FIGURE 7 represents one embodiment of a multiple bit memory device according to the invention, together with ancillary circuits comprising an operative system. The depth dimension or thickness of the various layers of the device shown in FIGURE 7 has been greatly exaggerated for clarity, it being understood that in a practical construction the various active elements shown in substantial thickness would actually comprise thin films.

A very thin layer 34 of ferroelectric material such as barium titanate or the like is formed on a very thin layer 35 of photoconductive material such as cadmium selenide, or the like. Deposited onto the front layer 35 are several groups (there being three shown in FIGURE 7) of very thin, transparent electrodes 36–38, comprising spaced apart rectangular strips arranged in rows. The electrodes 36–38 may be fabricated of very thin gold foil, crystalline stannic oxide, or other suitable conductive, transparent film. These electrodes 36–38 are all of the same general dimensions, except that the strips comprising electrodes 36 are all connected in parallel by a horizontal strip portion extending across the vertical strips. This assembly 36 is connected to lead 39. Conductors comprising electrode groups 37 and 38 are all separate and equally spaced as shown.

Lying perpendicularly across strip electrodes 36 are two electroluminescent bars 41 and 42. These bars are fabricated of an electroluminescent material such as zinc sulphide and are each provided with a pair of suitable electrodes. For purposes of clarity, bars 41 and 42 are shown as having a circular cross section; however, their exact configuration is immaterial, their primary function being to illuminate the underlying photoconductive layer 35. Suitable leads 43–44 connect the electrodes of bars 41 and 42 to switching matrix 45. Likewise, electroluminescent bars 46–49 and 51–54 lie across electrodes 37 and 38, and each is provided with lead wires 55–58 and 59–62, respectively, connecting to switching matrix 45.

Deposited onto the opposite surface of layer 34 are three rows of very thin opaque conductor strips (rows 63–65) being of the same number, width and spacing as electrode groups 36–38. However, because of their having different lengths than the opposing electrodes 36–38, the spacing between adjacent ends of conductor strips 63–65 is vertically staggered in relation to that of opposing electrodes 36–38.

Figure 9:
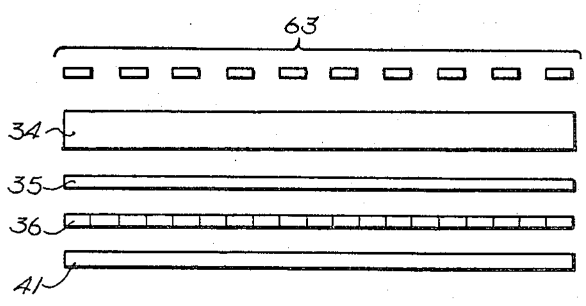
FIGURE 9 is an exploded top view of the apparatus of FIGURE 7.

FIGURE 8 is an exploded end view of the apparatus of FIGURE 7 which shows this construction in more detail, while FIGURE 9 is an exploded top view, also shown for more clarity.

The electrodes comprising rows 63–65 each consist of very thin strips of silver, gold, or platinum film. On the lower end of each conductor strip of row 65 is a corresponding lead wire 66–75 which connects to detection and data register circuits 76.

Each bit is stored by the sandwiched combination typified by electrode 36, layers 34 and 35, and electrode strip 63. Individual bits lie in horizontal rows and individual words lie in vertical rows. The output from the detection and data register circuits 76 is supplied via line 77 to ancillary readout or utilization equipment such as a computer, or display device 78, as desired.

As an input or primary data source, a computer or key board input device 79 produces appropriate signals which are fed via line 81 to switching matrix 45. To provide the necessary pulsing control, pulse timing generator 82 is connected via line 83 to input device 79 and to bipolar pulse source 84 via line 85, from which pulses are supplied to the memory device via lead 39. Also, bipolar pulse source 84 is connected to the detection and data register circuits 76 via line 85.

Inasmuch as each of the functional units represented by a block in FIGURE 7 (namely 45, 76, 78, 79, 82, and 84) may be any one of the numerous devices for each respective function well known in the art, it is deemed unnecessary to show circuitry details. The description of the memory device itself is considered sufficient to enable those skilled in the art to practice it.

As shown in FIGURES 7–9, the sets of electroluminescent bars (e.g. 41–42) are positioned over the transparent electrodes 36–38 such that each bar overlies all words at one given bit position.

The individual memory element demarcation is produced by light emanating from the overlying electroluminescent bar. This light spot permits a current to flow through the photoconductor 35, with voltage applied, only at the point of light impingement. Thus, current introduced to the ferroelectric material (e.g., layer 34 via electrodes 63–65) will define a discrete element since no significant current will flow transversely through the photoconductor material 35. The current path through the ferroelectric layer 34 terminates at conductors 63–65.

Figure 10:
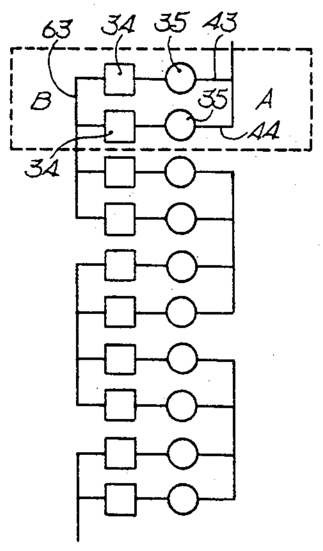
FIGURE 10 is a diagrammatic illustration of a typical circuit path through the apparatus of FIGURE 7.

The actual path of current flow can be followed readily in FIGURE 7 by comparing the similarity between the broken line 86 through the sandwich structure and the schematic diagram of FIGURE 10. For example, by examining points A and B beneath the two top electroluminescent bars 41 and 42, an effective common conductor can be seen with a series path through the photoconductor layer 35 and ferroelectric layer 34, in each case, joined by the common rear electrode 63. The circuit path then continuous from electrode 63 through layers 34 and 35 to a point between bars 46 and 47. The path then reverses its direction and continues as indicated by broken line 86.

*Word structure*

A simplified schematic diagram of two four-bit words is shown in FIGURE 11. The various states of polarization of the ferroelectric elements are indicated by arrows. Positive polarization is indicated by an upwardly pointing arrow and negative polarization is indicated by a downwardly pointing arrow (see also FIGURES 2 and 6). The shaded double line for each word, indicates the path through the positively polarized elements. If the photoconductors (indicated by circles) were not present in the device, application of a negative pulse would cause the elements in the series string to switch as one element. However, if one of the ferroelectric elements in the path indicated were negatively polarized, switching would not occur. The presence of the photoconductor elements provides the necessary gating function.

Figure 12:
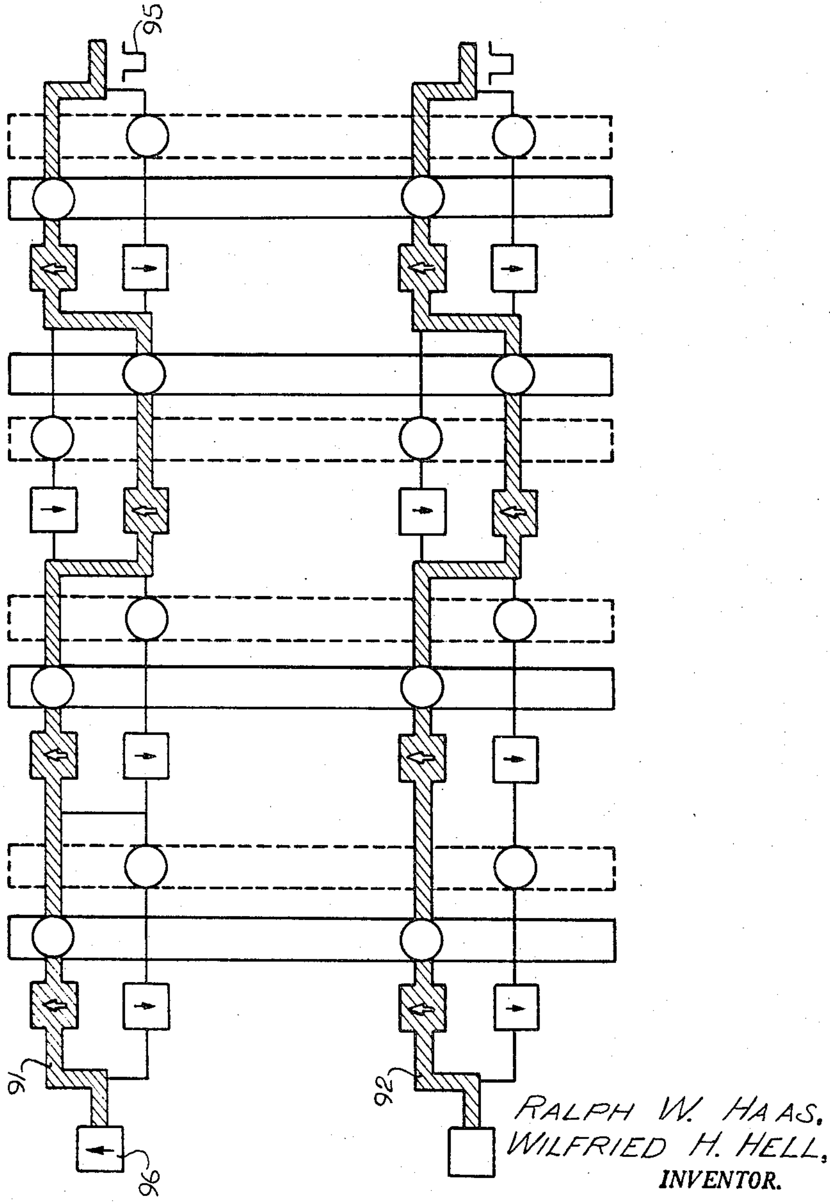
FIGURE 12 is a diagrammatic illustration of the inquiry mode of operation for the word "1101."

The current path 91 through the ferroelectric elements that would be selected by illuminating the photoconductors (path of low resistance) is shown in FIGURE 12. In this example, such an inquiry represents two four-bit words, each of which is "1101." By superimposing FIGURE 12 over FIGURE 11, the path 91 determined by the inquiry matches the path 93 through the stored information in the word shown in the upper part of the FIGURE 11. The paths 92 and 94 do not match in the lower word since the inquiry data do not match the stored data. Application of a negative voltage pulse 95 in the matching case 91 and 93 causes current to flow, thus switching the detector element 96 as shown.

Two electroluminescent light bars are indicated for each bit position. These are indicated at 97–98, 101–102, 103–104, and 105–106. Excitation of the left bar in each case (e.g. 97) accomplishes an interrogation for a digital one at a given bit position for all words in the memory, and the right bar (e.g. 98) interrogates for a zero.

*Inquiry sequence*

Figure 13:
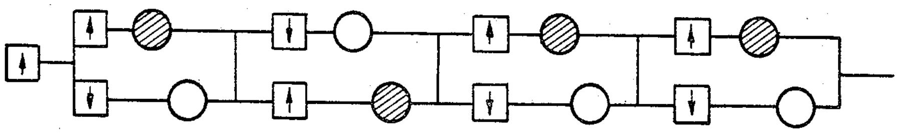
FIGURE 13 is a diagrammatic illustration of the first step of the inquiry sequence mode.
Figure 14:
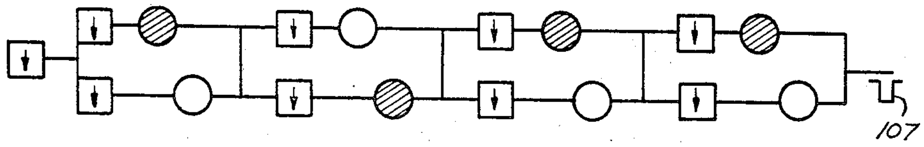
FIGURE 14 is a diagrammatic illustration of the second step of an inquiry sequence.
Figure 15:
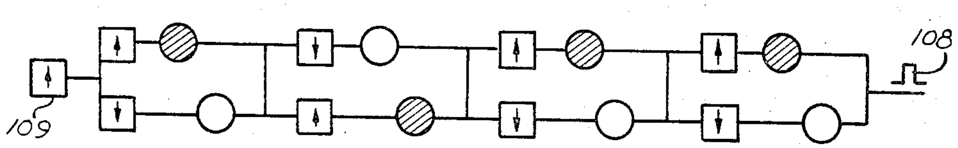
FIGURE 15 is a diagrammatic illustration of the third step of an inquiry sequence.

FIGURES 13–15 illustrate the three distinct steps of the inquiry sequence for the memory devices. As shown in FIGURE 13, the interrogation is initiated by exciting the proper electroluminescent bars necessary to illuminate the photoconductors at each bit position of every word in the memory. This step may be summarized as "light on."

As shown in FIGURE 14, a negative voltage pulse 107 is applied to all words in the memory in parallel. In the words in which a match exists between the pattern of the illuminated photoconductors (shaded circles) and the pattern of positive polarization, (arrows up, see FIGURE 13), the ferroelectric elements will switch in unison to a state of negative polarization (arrows down, see FIGURE 14). In words where no match exists, the current cannot flow, so the elements remain in their original state of polarization. This step may be summarized as "interrogate."

As shown in FIGURE 15, in order to reset the elements, a positive voltage pulse 108 is applied. The ferroelectric elements, including the detector element 109 which indicates a match has occurred, switch to a state of positive polarization. This step may be summarized as "reset."

*Read-in sequence*

FIGURES 16–19 illustrate the read-in sequence. To rewrite or substitute new data for old data stored in the memory, a four step sequence is employed. This sequence is identical to the inquiry sequence described hereinabove, with the exception that the light pattern is changed during the sequence cycle.

Figure 16:
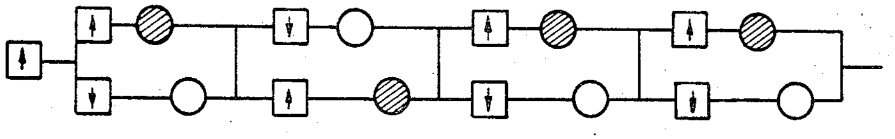
FIGURE 16 is a diagrammatic illustration of the first step of a read-in sequence mode.

As shown in FIGURE 16, the iterative light pattern that illuminates each word register represents the old data. This is the "light on" step.

Figure 17:
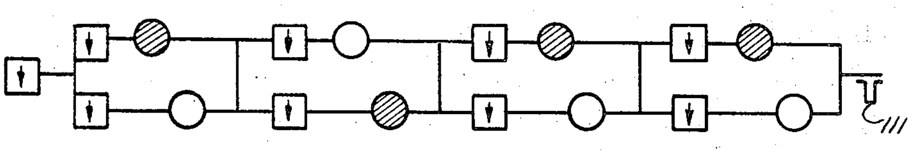
FIGURE 17 is a diagrammatic illustration of the second step of a read-in sequence.

As illustrated in FIGURE 17, application of a negative pulse 111 switches all ferroelectric elements in the gating path to a negative polarization. This is the "interrogate" step.

Figure 18:
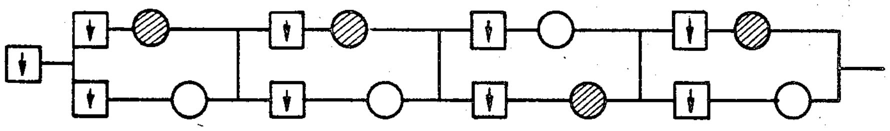
FIGURE 18 is a diagrammatic illustration of the third step of a read-in sequence.

As illustrated in FIGURE 18, the light pattern and the gating path are changed to represent the new data. This step may be termed "new light."

Figure 19:
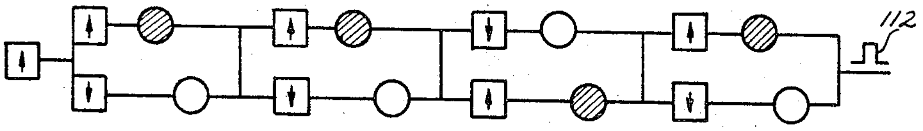
FIGURE 19 is a diagrammatic illustration of the fourth and final step of a read-in sequence.

As illustrated in FIGURE 19, application of a positive pulse 112 changes all ferroelectric elements in the gating path to a positive polarization. This comprises the "set new word" step. This sequence permits a "write-upon-match" operation, or changing simultaneously all words that match the inquiry.

*Detection*

Figure 20:
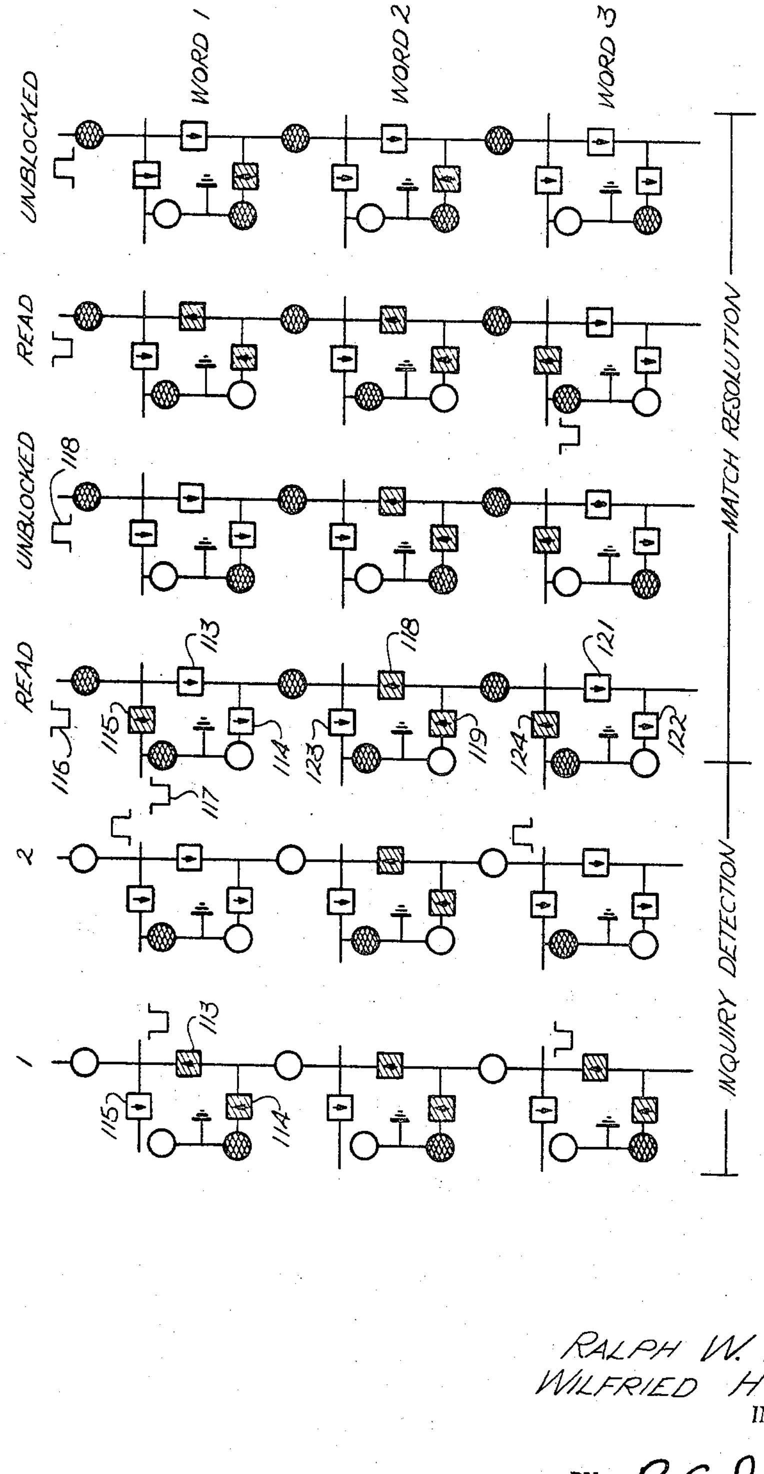
FIGURE 20 is a diagrammatic illustration useful in the exposition of detection resolution.

Reference should be made to FIGURE 20 in connection with the following discussion of readout and detection resolution. To save time during the readout operation, it is desirable to provide a means for logically selecting only those detection elements which indicate a match condition. For this purpose, three ferroelectric elements and three photoconductors perform the detection function for each word. These elements also perform the function of resolving a multiple-match condition. Two ferroelectric elements designated as the blocking elements 113 and 114 are switched to a negative state of polarization during inquiry upon application of a negative pulse to a matching word. The other ferroelectric element, designated as the read element 115, is switched to a positive state of polarization during inquiry upon application of a positive pulse to a matching word. The detection and match resolution elements are shown for words 1, 2, and 3 in which a match condition is shown for word 1 and word 3.

*Match resolution*

Match resolution for readout involves two steps. Each step involves excitation of the appropriate photoconductor and the application of a voltage pulse. The four steps necessary for resolving the match condition for word 1 and word 3 are shown in FIGURE 20. As indicated in step 1 (indicated as "read"), the application of a negative pulse 116 causes the read element 115 of word 1 to switch to a state of negative polarization providing a condition for readout. Application of a positive pulse 118 reverses the polarization of the blocking elements 113 and 114 of word 1. To read the next word, a negative voltage pulse 117 is applied. This pulse switches the series string of all blocking elements, 113–114, 118–119, and 121–122, without affecting the read elements 115, 123, down to the next word in which a match has occurred (in this case word 3) where the pulse is blocked, and will cause the read element 124 of that word to switch. The following positive pulse reverses the blocking elements of word 3 and the cycle continues.

In this manner, readout is affected only at those word positions where an inquiry match exists, automatically jumping over all other word positions in the memory.

*Complete memory system*

Figure 21:
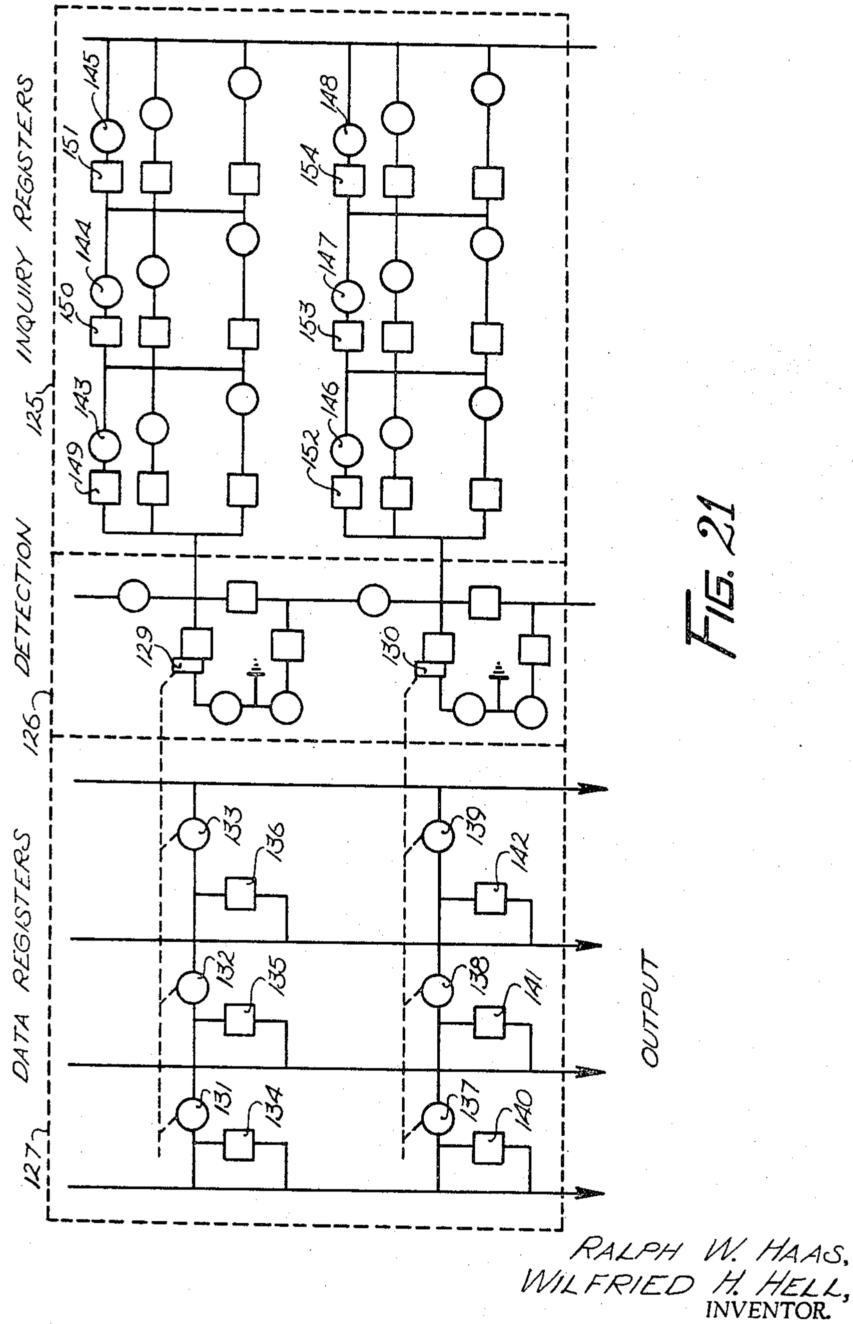
FIGURE 21 is a diagrammatic illustration of an overall logical memory system according to the invention.

FIGURE 21 illustrates the components of an overall logical memory system consisting of inquiry registers 125, detection and multiple match resolution logic 126, and data registers 127. A routine memory interrogation is initiated by excitation of the pertinent electroluminescent light bars, indicated generally at 129 and 130, necessary to formulate the inquiry. These bars then illuminate the corersponding photoconductors for each bit position 131–133 and 137–139 of a word for every word in the memory. The inquiry is then completed by application of negative voltage pulse followed by a positive voltage pulse. These voltage pulses cause a current flow to set the detection elements 126 of those words in which the inquiry data matches the stored content data 125. Readout of one word at a time is provided by a multiple match resolution made possible by the inherent logical gating capability of the detector elements. Successive negative and positive pulses cause a readout pulse followed by a reset of blocking elements for each word. Actual readout is achieved by the ferroelectric read element of a word with a match condition driving an electroluminescent light bar 129, which is associated with a specific data register. The actual bits read out are presented in parallel form to a special readout register which utilizes conventional circuits. In a normal sequence the data would be transmitted and voltage pulses would be applied to reset the data register 127 ferroelectric elements.

*Masking*

It is extremely useful to formulate an inquiry so as to examine certain specific bits or combinations of bits of a word during interrogation to determine whether the stored bits contain binary ones or binary zeroes. For this condition, it is not necessary that the other bits of any word register match the corresponding bits of the inquiry. For this purpose the memory device may incorporate a separate parallel photoconductor 143–148 and ferroelectric element 149–154 for each bit structure of a word register 125 to provide the capability for bypassing the bits that are of no interest. The iterative light pattern of the inquiry is caused to illuminate the associated "masking" photoconductors of the stored data to mask specific bits during an inquiry. This masking capability permits the use of the following inquiry functions:

| | |
|---|---|
| (1) Equal | (5) Next higher |
| (2) Greater than or equal | (6) Next lower |
| (3) Less than or equal | (7) Not between limits |
| (4) Between limits | (8) Not equal |

These diverse capabilities in interrogation allows the associative memory of the invention to realize an important potential in self organization.

As can be seen from the foregoing description of the invention, there is provided a novel electro-optical memory which may be modified to meet diverse application requirements. As an example of such modifications, a small fast memory may be constructed according to the invention for use as a peripheral element of a large digital computer. Using the same basic bit store, the invention may be organized as a large associative store which may be used for intelligence data processing in an off-line mode. The method of basic bit store is independent of the application.

The physical construction of the basic bit store may be modified over a range of materials and fabrication techniques. For example, the ferroelectric material mentioned hereinabove comprises barium titanate. However, other ferroelectric materials may be employed, i.e., materials such as triglycine sulfate (TGS) and triglycine fluoberyllate (TGFB) may be employed. These materials have a nearly rectangular hysteresis loop and may be changed from one polarized state to another polarized state with a single setting pulse or bias and with a minimum of fatigue. Any state once set will maintain its polarization until another state is set.

Since certain changes may be made in the above methods and devices without departing from the scope of the invention herein involved, it is intended that all matter contained in the above description and as shown in the accompanying drawings shall be interpreted as illustrative and not in a limiting sense. As can be seen, the methods and devices described hereinabove achieve the stated objectives and additionally provide advantages over digital memory devices proposed heretofore. Notably, the present invention provides a unique solution in providing superior circuit isolation. Ferroelectric material for storage, and photoconductor material for gating, as employed in the present invention, offers superior advantages in realizing maximum inherent logic capabilities and flexibility. Utilization of thin film fabrication techniques as herein contemplated provide an exceptionally simple and economic construction.

While there have been shown and described and pointed out the fundamental novel features of the invention as applied to preferred embodiments, it will be understood that various omissions and substitutions and changes in the form and details of the devices illustrated in their operation may be made by those skilled in the art, without departing from the spirit of the invention; therefore, it is intended that the invention be limited only as indicated by the scope of the following claims:

What is claimed is:

1. A bit store comprising:

a pair of photoelectric elements each having an input and an output; means connecting the inputs of said photoelectric elements in common;

a pair of ferroelectric elements each having an input and an output;

means connecting the outputs of said ferroelectric elements in common;

means connecting the output of one of said photoelectric elements to the input of one of said ferroelectric elements;

means for connecting the output of the other of said photoelectric elements to the input of the other of said ferroelectric elements;

first light source means for selectively illuminating said one photoelectric element to establish an electrical circuit path from said common input connecting means through the series combination of said one photoelectric element and said one ferroelectric element to said common output connecting means; and, second light source means for selectively illuminating said other photoelectric element to establish an electrical circuit path from said common input connecting means through the series combination of said other ferroelectric element to said common output connecting means.

2. A bit store as defined in claim 1 wherein each of said photoelectric elements comprises a thin film deposited onto a surface of a corresponding one said ferroelectric elements.

3. A bit store as defined in claim 1 wherein each of said photoelectric elements comprises a film of photoconductive cadmium selenide.

4. A bit store as defined in claim 1 wherein each of said ferroelectric elements comprises a thin film deposited onto a surface of a corresponding one said photoelectric element.

5. A bit store as defined in claim 1 wherein each said ferroelectric elements comprises a thin film selected from the group comprising barium titanate, triglycine sulfate, and triglycine fluoberyllate.

6. A bit store as defined in claim 1 wherein said first and second light source means each comprises an electroluminescent element.

7. A bit store comprising:

a pair of ferroelectric elements, one of which represents a binary one and the other of which represents a binary zero;

terminal means common to both of said ferroelectric elements;

a pair of photoelectric elements electrically in series with corresponding ones of said ferroelectric elements;

means for selectively illuminating only one or the other of said photoelectric elements to establish an electrical path therethrough to the corresponding one of said ferroelectric elements; and means connected to said path for polarizing only one of said ferroelectric elements as determined by which of said photoelectric elements is illuminated.

8. A bit store as defined in claim 7 including means connected to said terminal means for detecting which of said ferroelectric elements has been polarized and thereby indicate a binary one or a binary zero.

9. A bit store as defined in claim 7 including means connected to said photoelectric elements for supplying a polarizing potential to said ferroelectric elements when corresponding ones of said photoelectric elements are illuminated.

10. A bit store as defined in claim 7 wherein said illuminating means comprises a pair of electroluminescent elements, only one of which may be individually activated at a time.

11. A bit store comprising:
first and second photoconductive elements;
first and second ferroelectric elements electrically in series with corresponding ones of said photoconductive elements;
a first terminal connected in common to said photoconductive elements;
a second terminal connected in common to said ferroelectric elements;
a first light source for selectively illuminating said first photoconductive element and thereby establish an electrical circuit path between said first and second terminals through the series combination of said first photoconductive element and said first ferroelectric element; and,
a second light source for selectively illuminating said second photoconductive element and thereby establish an electrical circuit path between said first and second terminals through the series combination of said second photoconductive element and said second ferroelectric element.

12. A bit store as defined in claim 11 wherein said first and second light sources each comprises an electroluminescent element.

13. An associative memory comprising:
first and second pairs of photoconductive elements;
a first terminal connected in common to said first pair of photoelectric elements;
first and second pairs of ferroelectric elements, one ferroelectric element in each pair being connected in series with a corresponding photoelectric element in one of said pairs of photoelectric elements;
a second terminal connected in common to said second pair of ferroelectric elements; and
a plurality of light sources for illuminating selected ones of said photoconductive elements whereby corresponding electrical paths may be provided between said first and second terminals.

14. An associative memory as defined in claim 13 including means connected to said first terminal for polarizing those of said ferroelectric elements, which are in series with photoconductive elements illuminated by selected ones said light sources.

15. An associative memory as defined in claim 13 including:
detector means connected to said electrical path and responsive to the polarization of said ferroelectric element to indicate the existence of a word in said memory.

16. A bit store comprising:
a pair of thin film ferroelectric elements having a common junction therebetween;
a pair of thin film photoconductive elements having a common junction and each of which is in surface contact with a corresponding one of said ferroelectric elements;
first and second electroluminescent means disposed adjacent corresponding ones of said photoconductive elements for selectively illuminating said photoconductive elements to establish a circuit path therethrough to selected ones of said ferroelectric elements; and
means connected to said common junctions for applying a polarizing potential of a selected polarity to said selected ferroelectric elements.

17. A bit store as defined in claim 16 wherein said potential applying means comprises:
a transparent conductive film element connected to said photoconductive junction and a thin conductive film connected to said ferroelectric element.

18. A digital word register comprising:
a plurality of bit stores, each of which comprises
a pair of series-connected ferroelectric elements and photoconductive elements;
first illuminating means common to all of said bit stores for illuminating only one of the said photoconductors in each of said bit stores;
second illuminating means common to all of said bit stores for illuminating only the other of the photoconductors in each of said bit stores; and
conductor means interconnecting said bit stores to provide an electrical path therethrough as determined by which of said photoelectric elements are illuminated by said first and second illuminating means.

19. A digital memory device comprising:
a sheet of ferroelectric material;
a sheet of photoconductive material having one surface in contact with, and overlying, one surface of said ferroelectric sheet;
a plurality of transparent conductive electrodes spaced apart on the other surface of said photoconductive sheet;
a plurality of conductors spaced apart on the other surface of said ferroelectric sheet; and
electroluminescent means lying transversely across all of said transparent conductive electrodes.

20. A digital memory device comprising:
a thin film of ferroelectric material having first and second planar surfaces;
a thin film of photoconductive material deposited onto said first surface of said film of ferroelectric material;
a plurality of elongate transparent conductor strips in contact with exposed surface of said film of photoconductive material and arranged in spaced apart horizontal rows and vertical columns;
a plurality of elongate metallic conductors spaced apart on said second surface of said ferroelectric film, and arranged in opposition to said conductor strips in the horizontal plane and staggered with respect to said conductor strips in the vertical plane;
a plurality of electroluminescent bar members each of which is transversely disposed over a corresponding horizontal row of said conductor strips, and adapted to illuminate the area of said photoconductive film thereunder;
first lead means for completing a circuit path to said plurality of conductive strips; and
second lead means for completing a circuit path to said plurality of metallic conductors.

21. A digital memory device as defined in claim 20 wherein one of said rows of conductor strips is provided with a horizontally disposed interconnecting conductor which is connected to said first lead means.

22. A digital memory as defined in claim 20 including:
polarizing means connected to said first and second lead means for supplying a polarizing potential to the areas of said ferroelectric film adjacent said illuminated areas.

23. A digital memory as defined in claim 20 including:
switching means connected to said bar members for activating selected ones thereof.

24. A digital memory as defined in claim 22 including:
detector means connected to said second lead means for indicating which of said areas of said ferroelectric film have been polarized by the application of said polarizing potential.

25. The method of storing a binary digit comprising the steps of:
generating a polarizing potential;
applying said potential to a pair of light responsive gates which are to control the transmission of said potential;
selectively illuminating one or the other of said gates to permit transmission of said potential therethrough; and
applying the potential transmitted through the selected one of said gates to a corresponding one of a pair of reversibly polarizable elements to establish a given polarized state therein and thereby establish a stored binary digit condition in said element.

26. A bit store as defined in claim 1 including:
means for applying a positive voltage pulse to said common input connecting means for conduction through only one of said electrical circuit paths; and,
means for applying a negative voltage pulse to said common input connecting means for conduction through only the other of said circuit paths.

27. An associative memory comprising:
a plurality of bit stores connected in series, each of which comprises
a first signal path including a first light responsive gate in series with a first reversibly polarizable ferroelectric element;
a second signal path including a second light responsive gate in series with a second reversibly polarizable ferroelectric element;
means for connecting said first and second signal paths in parallel; and
illuminating means for simultaneously activating selected ones of said gates in each of said bit stores.

28. An associative memory comprising:
a plurality of bit stores connected in series, each of which includes a plurality of gates responsive to light to establish a circuit path therethrough;
reversibly polarizable ferroelectric means connected to said gates for receiving a polarity-reversing signal therethrough;
a plurality of discrete electroluminescent light sources for activating selected ones of said gates in each of said bit stores; and
switching means for simultaneously activating selected ones of said light sources and thereby establish a circuit path through said series-connected bit stores.

References Cited

UNITED STATES PATENTS

| | | | |
|---|---|---|---|
| 2,905,830 | 9/1959 | Kazan | 250—213 |
| 2,999,165 | 9/1961 | Lieb | 250—208 |
| 3,229,261 | 1/1966 | Fatuzzo | 340—173 |
| 3,148,354 | 9/1964 | Schaffert | 340—173 |

TERRELL W. FEARS, *Primary Examiner.*